(12) United States Patent
Chang et al.

(10) Patent No.: US 10,795,498 B1
(45) Date of Patent: Oct. 6, 2020

(54) TOUCH CONTROL DEVICE

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Chih-Peng Chang, Guangdong (CN); Ping-Yang Chen, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 16/541,185

(22) Filed: Aug. 15, 2019

(30) Foreign Application Priority Data

Jun. 27, 2019 (CN) .......................... 2019 1 0566992

(51) Int. Cl.
*G06F 3/041* (2006.01)
*G06F 3/044* (2006.01)

(52) U.S. Cl.
CPC .......... *G06F 3/0416* (2013.01); *G06F 3/0414* (2013.01); *G06F 3/0445* (2019.05)

(58) Field of Classification Search
CPC ..... G06F 3/0414; G06F 3/0416; G06F 3/0445
See application file for complete search history.

(56) References Cited

U.S. PATENT DOCUMENTS

| | | | |
|---|---|---|---|
| 9,772,727 B2 * | 9/2017 | Kim | G06F 3/044 |
| 2014/0063361 A1 * | 3/2014 | Lo | G06F 3/044 |
| | | | 349/12 |
| 2014/0347577 A1 * | 11/2014 | Chen | G06F 3/044 |
| | | | 349/12 |
| 2015/0169109 A1 * | 6/2015 | Park | G06F 3/0446 |
| | | | 345/174 |
| 2016/0370892 A1 * | 12/2016 | Chang | G06F 3/0416 |
| 2017/0285780 A1 * | 10/2017 | Park | G06F 3/044 |
| 2018/0196564 A1 * | 7/2018 | Lin | G06F 3/044 |
| 2018/0309079 A1 * | 10/2018 | Matsumoto | G06F 3/0443 |
| 2020/0218391 A1 * | 7/2020 | Kamiya | H01L 51/50 |

* cited by examiner

*Primary Examiner* — Ryan A Lubit
(74) *Attorney, Agent, or Firm* — CKC & Partners Co., LLC

(57) ABSTRACT

Disclosed is a touch control device having a substrate, a first touch-sensing electrode layer, a second touch-sensing electrode layer, a first insulating layer, a second insulating layer, and a circuit layer. The substrate includes a first region and a second region. The first and second touch-sensing electrode layers are located in the first region. The first insulating layer is located between the first and second touch-sensing electrode layers. The second insulating layer is disposed on the first insulating layer and the second touch-sensing electrode layer. The first region and a portion of the second region are covered by the second insulating layer. The circuit layer is located in the second region and has a first portion and a second portion. The first portion is in direct contact with the substrate. The second portion partially covers the first or the second touch-sensing electrode layer to form a contact area.

10 Claims, 10 Drawing Sheets

TOUCH CONTROL DEVICE

CROSS-REFERENCE TO RELATED APPLICATION

This application claims priority to China Application Serial Number 201910566992.7, filed Jun. 27, 2019, which is herein incorporated by reference.

BACKGROUND

Field of Invention

The present invention relates to a touch control device.

Description of Related Art

At present, silver nanowires have been widely adopted as an electrode material for touch control devices. However, during the etching process of forming traces, silver nanowires are prone to be attacked by the etching liquid if the material of trace is copper and the trace is in direct contact with the silver nanowires. This is due to the low selectivity of the etching liquid to copper and silver nanowires. In addition, the etching liquid remained at the interface between copper and silver after the etching process can render the formation of copper-silver co-crystals, thereby causing short circuit issue of the traces. Furthermore, the interface adhesion between copper and silver nanowires is poor. Therefore, a new design is needed to address the foregoing issues.

SUMMARY

One aspect of the present invention is to provide a touch control device. The touch control device can eliminate the short circuit problem of traces caused by copper/silver co-crystals. The touch control device comprises a substrate, a first touch-sensing electrode layer, a second touch-sensing electrode layer, a first insulating layer, a second insulating layer, and a circuit layer. The substrate comprises a first region and a second region adjacent thereto. The first touch-sensing electrode layer and a second touch-sensing electrode layer are disposed over the substrate and located in the first region. The first insulating layer is located between the first touch-sensing electrode layer and the second touch-sensing electrode layer. The second insulating layer is disposed on the second touch-sensing electrode layer. The second insulating layer completely covers the first region and partially covers the second region. The circuit layer is located over the substrate. The circuit layer has a first portion and a second portion extending from the first portion, in which the first portion is in direct contact with the substrate, and the second portion is located in the second region and partially covers the first touch-sensing electrode layer or the second touch-sensing electrode layer to form a contact area.

In some embodiments of the present invention, a height difference between the first portion and the second portion of the circuit layer ranges from 0.02-20 μm in the first direction.

In some embodiments of the present invention, a first thickness of the first touch-sensing electrode layer ranges from 2~30 μm in the first direction.

In some embodiments of the present invention, a second thickness of the second touch-sensing electrode layer ranges from 1.5~20 μm in the first direction.

In some embodiments of the present invention, the touch control device further comprises a bottom insulating layer disposed between the first touch-sensing electrode layer and the substrate.

In some embodiments of the present invention, both of the first touch-sensing electrode layer and the second touch-sensing electrode layer comprise a plurality of nano-metal wires.

In some embodiments of the present invention, both of the first touch-sensing electrode layer and the second touch-sensing electrode layer comprise a photosensitive material.

In some embodiments of the present invention, in the second region, the circuit layer and the second touch-sensing electrode layer have a first width and a second width, respectively, in a second direction perpendicular to the first direction, and the first width is smaller than the second width.

In some embodiments of the present invention, in the second region, the circuit layer and the second touch-sensing electrode layer have a first width and a second width, respectively, in a second direction perpendicular to the first direction, and the first width is greater than the second width.

In some embodiments of the present invention, the second insulating layer comprises a transparent photosensitive material.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
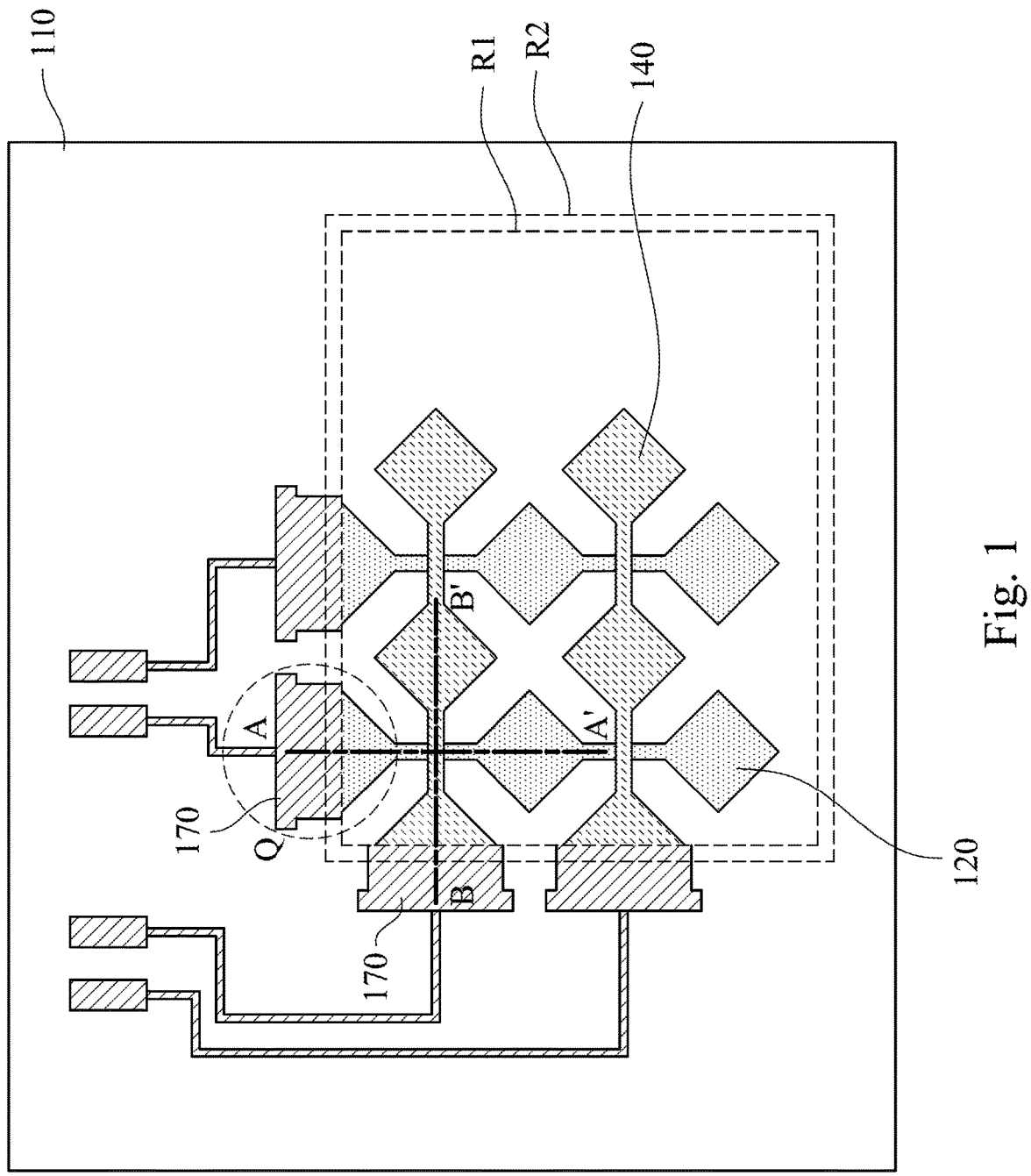
FIG. 1 is a top view of a touch control device according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. The embodiments disclosed below may be combined or substituted with each other in an advantageous situation, and other embodiments may be added to an embodiment without further description or explanation.

In the following description, numerous specific details are set forth in the following detailed description. However, embodiments of the present invention may be practiced without such specific details. In order to simplify the drawings, well-known structures and devices are only schematically shown in the figure.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Further, spatially relative terms, such as "above," "below," "upper," "lower," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2A:
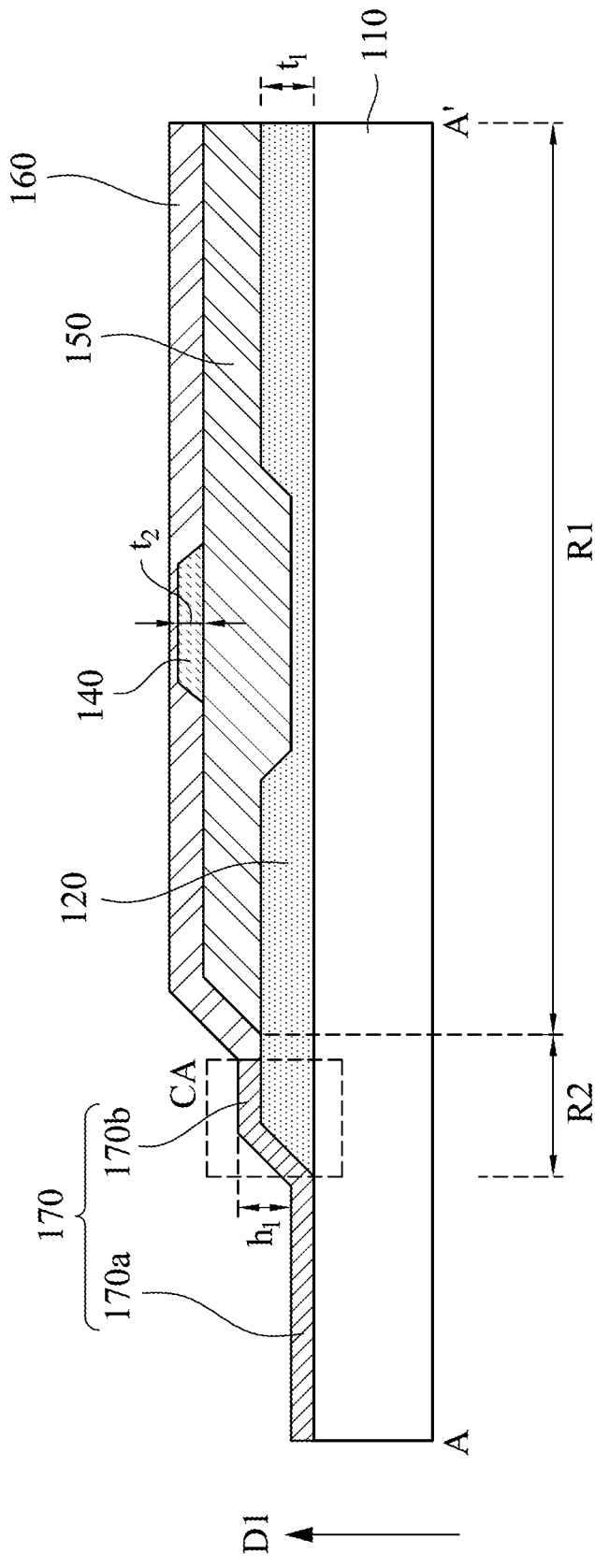
FIG. 2A is a cross-sectional view of the touch control device in FIG. 1 along line A-A' according to one embodiment of the present invention.
Figure 2B:
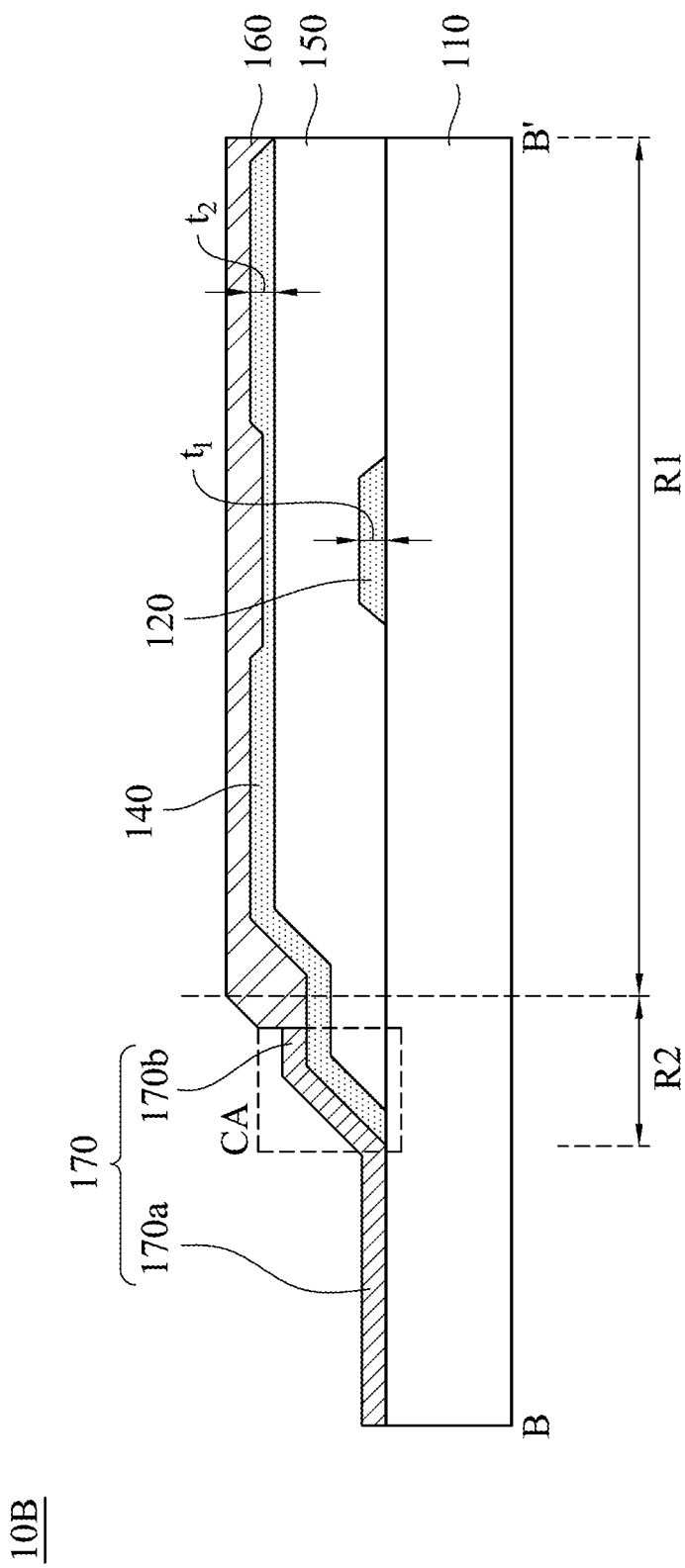
FIG. 2B is a cross-sectional view of the touch control device in FIG. 1 along line B-B' according to one embodiment of the present invention.

One aspect of the present invention is to provide a touch control device. The touch control device can eliminate the short circuit problem of traces caused by copper/silver co-crystals. Reference is made to FIG. 1 and FIG. 2A. FIG. 1 is a top view illustrating a touch control device 10 according to one embodiment of the present invention. FIG. 2A is a cross-sectional view of the touch control device 10 in FIG. 1 along line A-A' according to one embodiment of the present invention. FIG. 2B is a cross-sectional view of the touch control device 10 in FIG. 1 along line B-B' according to one embodiment of the present invention. As shown in FIG. 1, FIG. 2A and FIG. 2B, the touch control device 10 comprises a substrate 110, a first touch-sensing electrode layer 120, a second touch-sensing electrode layer 140, a first insulating layer 150, a second insulating layer 160, and a circuit layer 170. The substrate 110 comprises a first region R1 and a second region R2. The first region R1 is adjacent to the second region R2. In some embodiments, the first region R1 is a visible area, the second region R2 is a peripheral area, and a surrounding circuit area is disposed outside the peripheral area. In one embodiment, the second region R2 surrounds the first region R1. In one embodiment, the substrate 110 includes, but is not limited to, a flexible soft transparent material, such as polyethylene terephthalate (PET), polyethylene (PE), polyimide (PI), and the like. In one embodiment, a thickness of the substrate 110 ranges from 5~150 μm.

Reference is made to FIG. 2A. The first touch-sensing electrode layer 120 and the second touch-sensing electrode layer 140 are disposed over the substrate 110 and are located in the first region R1. In the embodiment shown in FIG. 2A, the first touch-sensing electrode layer 120 is in direct contact with the substrate 110 and extends to the second region R2 from the first region R1, such that the substrate 110 is partially covered by the first touch-sensing electrode layer 120. In some embodiments, both of the first touch-sensing electrode layer 120 and the second touch-sensing electrode layer 140 include a plurality of nano-metal wires. The nano-metal wires may be, for example, nano-silver wires, nano-gold wires, or nano-copper wires. In some embodiments, the first touch-sensing electrode layer and the second touch-sensing electrode layer are formed by exposing and developing a photosensitive material with nano-metal wires dispersed therein. In some embodiments of the present invention, a first thickness $t_1$ of the first touch-sensing electrode layer 120 ranges from 2~30 μm in a first direction D1. The first direction D1 is perpendicular to the substrate 110. In some embodiments of the present invention, a second thickness $t_2$ of the second touch-sensing electrode layer 140 ranges from 1.5~20 μm in the first direction D1.

Reference is still made to FIG. 2A. The first insulating layer 150 is located between the first touch-sensing electrode layer 120 and the second touch-sensing electrode layer 140. In detail, the first insulating layer 150 is located in the first region R1 and covers the first touch-sensing electrode layer 120, and the second touch-sensing electrode layer 140 is disposed on the first insulating layer 150. The first insulating layer 150 includes, but are not limited to, polyacrylate, epoxy resin, polyurethane, polysilane, polysiloxane, poly(silicone-acrylic), and the like.

The second insulating layer 160 is disposed on the first insulating layer 150 and the second touch-sensing electrode layer 140. It is noted that the second insulating layer 160 completely covers the first region R1 and merely covers a portion of the second region R2. In detail, the second insulating layer 160 completely covers the second touch-sensing electrode layer 140 and the first insulating layer 150 in the first region R1 and covers only a portion of the first touch-sensing electrode layer 120 in the second region R2. In some embodiments, the second insulating layer 160 includes a transparent photosensitive material (such as a transparent photosensitive film). In some embodiments, a thickness of the second insulating layer 160 ranges from 3~10 μm.

The circuit layer 170 is located over the substrate 110 and has a first portion 170a and a second portion 170b. The circuit layer 170 includes, but is not limited to, a metal and an alloy thereof, such as copper, gold, silver or a copper alloy. The first portion 170a is in direct contact with the substrate 110. The second portion 170b is located in the second region R2, contacts and partially covers the first touch-sensing electrode layer 120. A first height difference $h_1$ exists between the first portion 170a and the second portion 170b of the circuit layer 170 in the first direction D1. In some embodiments, the first height difference h1 ranges from 0.02-20 μm, preferably from 1-15 μm, and more preferably from 5-10 μm. In some embodiments, a thickness of the circuit layer 170 ranges from 0.02~10 μm. In the following description, the contacting portion between the second portion 170b and the first touch-sensing electrode layer 120 is referred to as a contact area "CA". It is noted that in the second region R2, the contact area "CA" is not covered by the second insulating layer 160.

FIG. 2B is a cross-sectional view of the touch control device in FIG. 1 along line B-B' according to one embodiment of the present invention. As shown in FIG. 2B, the first touch-sensing electrode layer 120 and the second touch-sensing electrode layer 140 are disposed over the substrate 110 and are located in the first region R1. The first touch-sensing electrode layer 120 is in direct contact with the substrate 110. The first insulating layer 150 is located between the first touch-sensing electrode layer 120 and the second touch-sensing electrode layer 140. In detail, the first insulating layer 150 is located in the first region R1 and covers the first touch-sensing electrode layer 120, and the second touch-sensing electrode layer 140 is disposed on the first insulating layer 150. The second insulating layer 160 is disposed over the first insulating layer 150 and the second touch-sensing electrode layer 140. It is noted that the second insulating layer 160 completely covers the first region R1, and partially covers only a portion of the second region R2. In detail, the second insulating layer 160 completely covers the second touch-sensing electrode layer 140 and the first insulating layer 150 in the first region R1, and covers only a portion of the first touch-sensing electrode layer 120 in the second region R2. The circuit layer 170 is located over the substrate 110 and has a first portion 170a and a second portion 170b. The first portion 170a is in direct contact with the substrate 110. The second portion 170b is located in the second region R2, contacts and partially covers the first touch-sensing electrode layer 120. In some embodiments, a thickness of the circuit layer 170 ranges from 0.02~10 µm. In the following description, the contacting portion between the second portion 170b and the first touch-sensing electrode layer 120 is referred to as a contact area "CA". It is noted that in the second region R2, the contact area "CA" is not covered by the second insulating layer 160.

Figure 3:
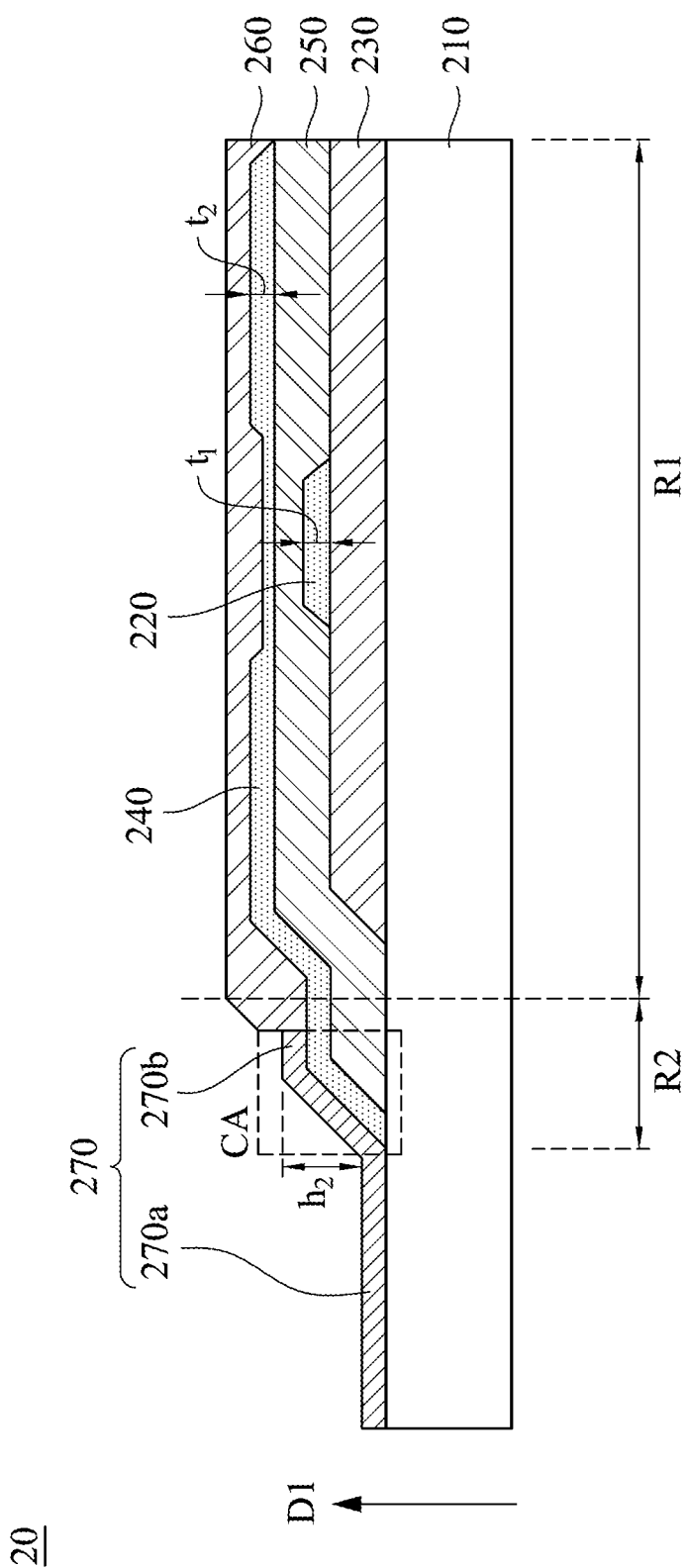
FIG. 3 is a cross-sectional view of the touch control device in FIG. 1 along line B-B' according to another embodiment of the present invention.

FIG. 3 is a cross-sectional view of a touch control device 20 according to another embodiment of the present invention, which is substantially along the position of line B-B in FIG. 1. As shown in FIG. 3, the touch control device 20 comprises a substrate 210, a first touch-sensing electrode layer 220, a bottom insulating layer 230, a second touch-sensing electrode layer 240, a first insulating layer 250, a second insulating layer 260, and a circuit layer 270. The touch control device 20 is substantially the same as the touch control device 10 described above, and they are different in that the touch control device 20 further includes the bottom insulating layer 230. The bottom insulating layer 230 is disposed on the substrate 210, and the first touch-sensing electrode layer 220 is disposed on the bottom insulating layer 230. The other components of the touch control device 20 are the same as those of the touch control device 10.

FIGS. 4A to 4D are enlarged views of a local region "Q" in FIG. 1 according to various embodiments of the present invention. For the sake of simplicity, only the first touch-sensing electrode layer 120 and the circuit layer 170 are shown in FIG. 4A to FIG. 4D, and other components (such as the first insulating layer 150 and the second insulating layer 160) are not shown, in order to further illustrate the relative configuration relationship between the first touch-sensing electrode layer 120 (and/or the second touch-sensing electrode layer 140) and the circuit layer 170 in the second region R2.

Figure 4A:
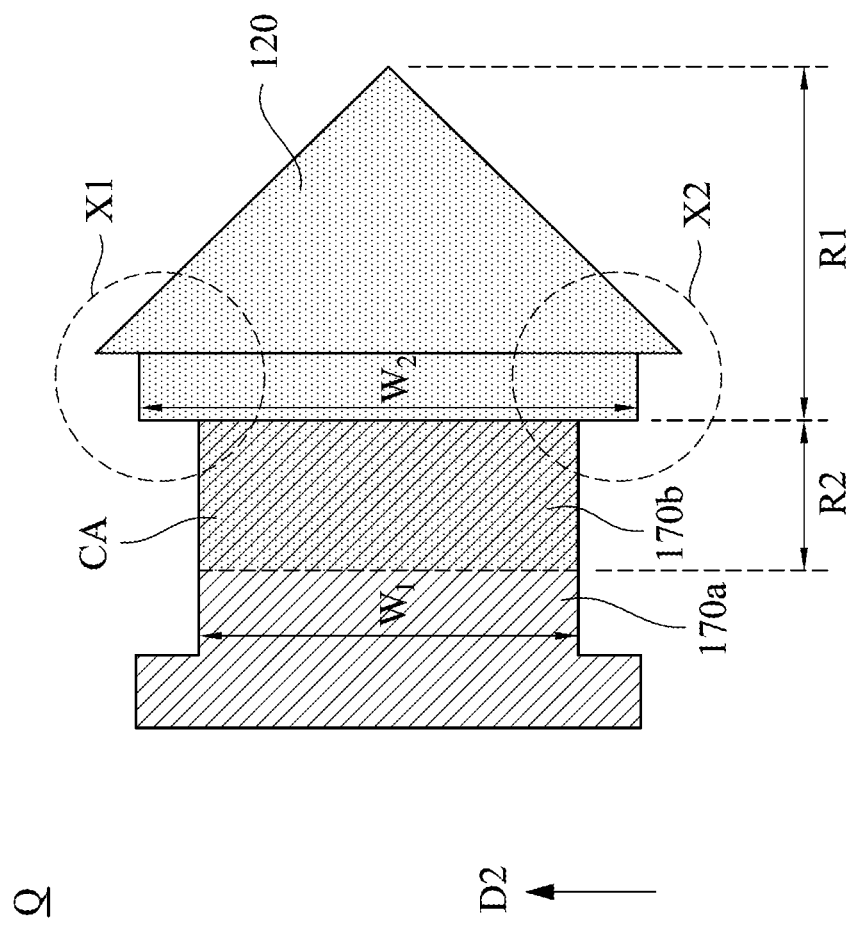
FIGS. 4A to 4D are enlarged views of a local region in FIG. 1 according to various embodiments of the present invention.

Referring to FIG. 4A, in the second region R2, the second portion 170b of the circuit layer 170 is in contact with the first touch-sensing electrode layer 120, thereby forming the contact area "CA". In other words, in the second region R2, the circuit layer 170 and the first touch-sensing electrode layer 120 together form a T-shaped structure (i.e., T-bar). The T-shaped structure includes the first portion 170a of the circuit layer 170 and the contact area "CA". The contact area "CA" includes the second portion 170b and the first touch-sensing electrode layer 120 contacting with each other.

Further, in the second region R2, in the second direction D2, the second portion 170b of the circuit layer 170 has a first width W1, and the first touch-sensing electrode layer 120 has a second width W2. It is noted that in the embodiment shown in FIG. 4A, the first width W1 of the circuit layer 170 smaller than the second width W2 of the first touch-sensing electrode layer 120. Therefore, in the second region R2, as shown in the region X1 and the region X2, the first touch-sensing electrode layer 120 protrudes from the second portion 170b of the circuit layer 170 in the second direction D2.

Figure 4B:
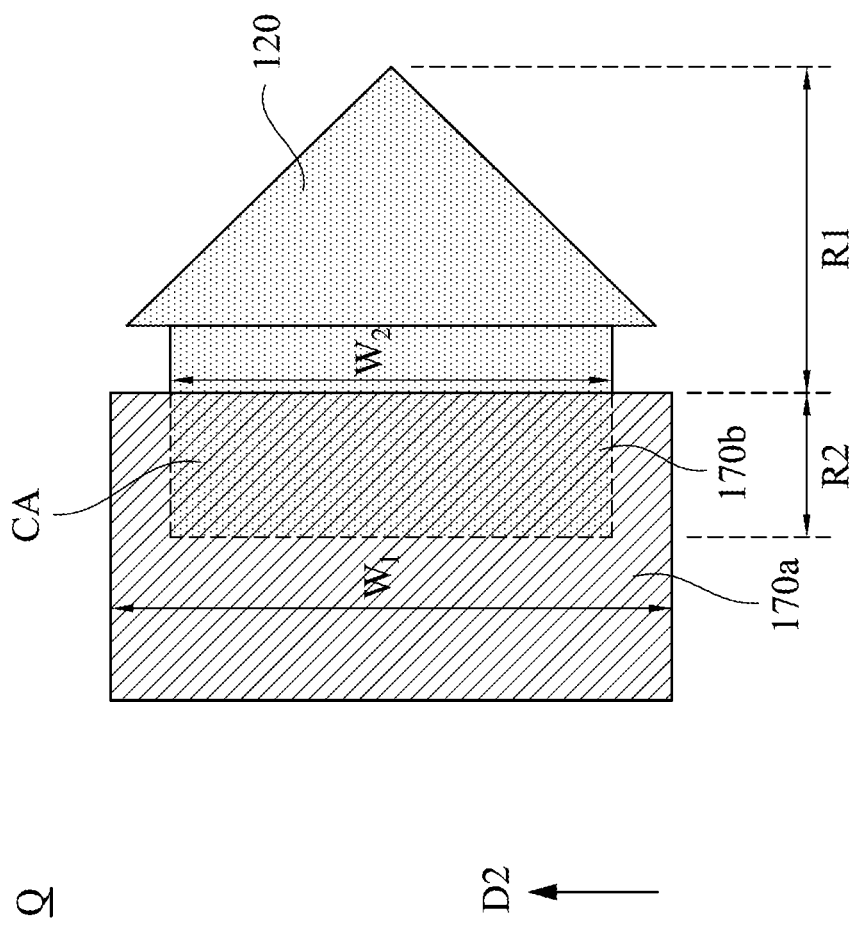

FIG. 4B is an enlarged view of local region "Q" in FIG. 1 according to another embodiment of the present invention. It is noted that in the embodiment shown in FIG. 4B, in the second region R2, the first width W1 of the circuit layer 170 is greater than the second width W2 of the first touch-sensing electrode layer 120. Therefore, in the second region R2, the first touch-sensing electrode layer 120 is completely covered by the circuit layer 170 in the contact area "CA" in the second direction D2. In other words, the first touch-sensing electrode layer 120 in the contact area "CA" does not protrude from the circuit layer 170.

Figure 4C:
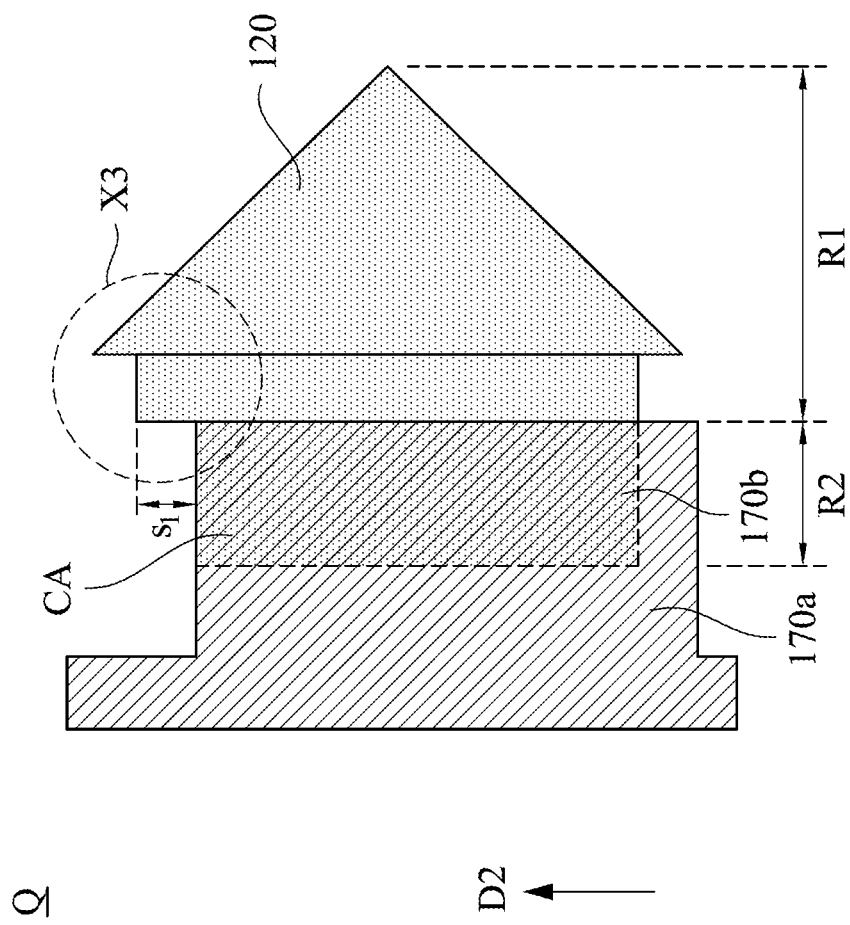

FIG. 4C is an enlarged view of local region "Q" in FIG. 1 according to yet another embodiment of the present invention. It is noted that in the embodiment shown in FIG. 4C, a shift occurs in the overlap of the circuit layer 170 and the first touch-sensing electrode layer 120. In detail, in the second region R2, as shown in region X3, the upper side of the first touch-sensing electrode layer 120 protrudes from the second portion 170b of the circuit layer 170 in the second direction D2. A spacing $s_1$ exists between the upper side of the first touch-sensing electrode layer 120 and the contact area "CA".

Figure 4D:
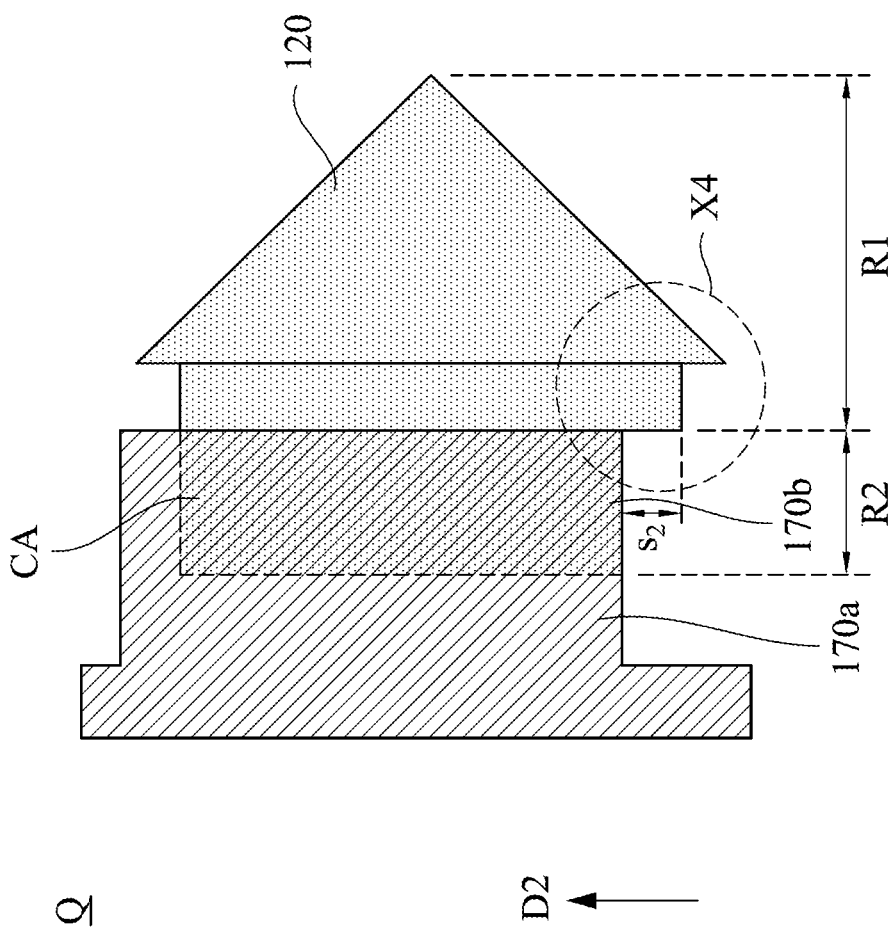

FIG. 4D is an enlarged view of local region "Q" in FIG. 1 according to yet another embodiment of the present invention. It is noted that in the embodiment shown in FIG. 4D, a shift occurs in the overlap of the circuit layer 170 and the first touch-sensing electrode layer 120. In detail, in the second region R2, as shown in region X4, the lower side of the first touch-sensing electrode layer 120 protrudes from the second portion 170b of the circuit layer 170 in the second direction D2. A spacing $s_2$ exists between the lower side of the first touch-sensing electrode layer 120 and the contact area "CA". FIG. 4A to FIG. 4D illustrate the relative arrangement relationship between the first touch-sensing electrode layer 120 and the circuit layer 170 in the second region R2. However, the relative arrangement relationship between the second touch-sensing electrode layer 140 and the circuit layer 170 in the second region R2 can be explained accordingly.

Figure 5:
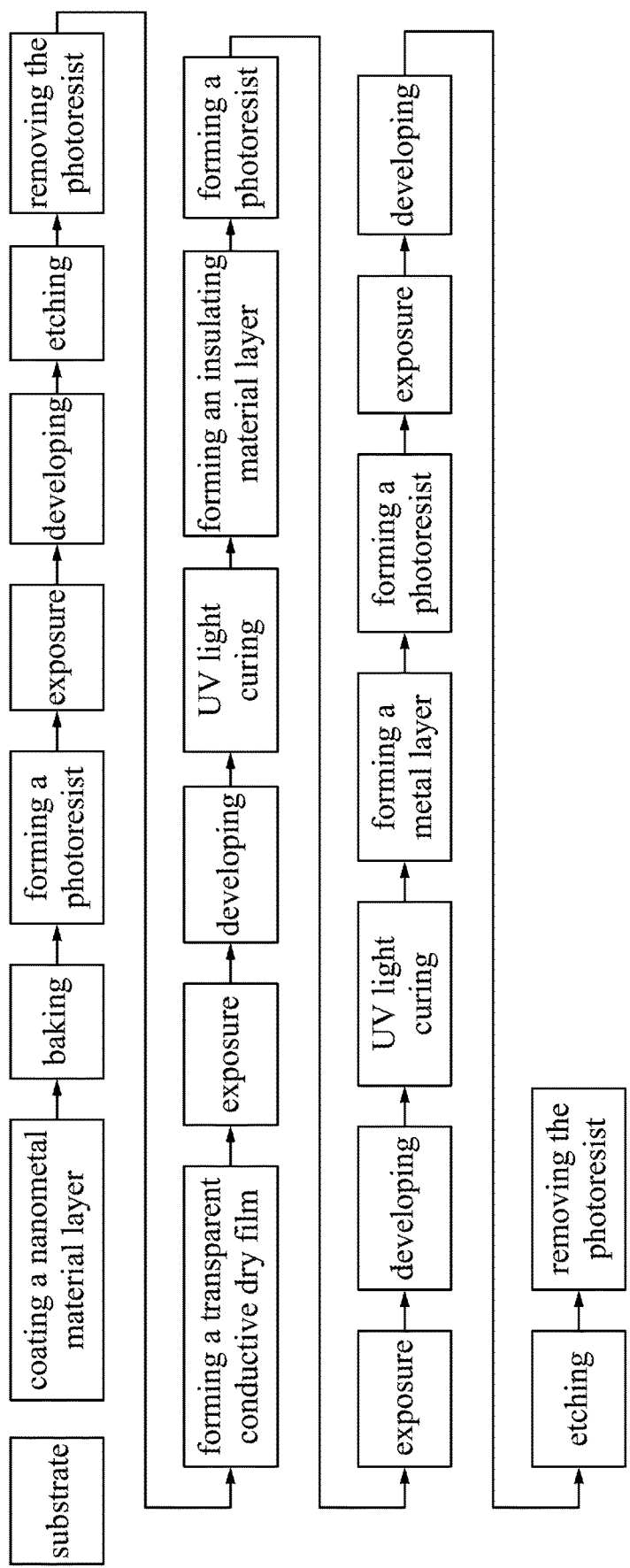
FIG. 5 is a flow chart for manufacturing the touch control device shown in FIG. 2A according to one embodiment of the present invention.

FIG. 5 is a flow chart for manufacturing the touch control device shown in FIG. 2A according to one embodiment of the present invention. The flow chart comprises the following operations. First, a first nano-metal material layer is coated on the substrate 110. The first nano-metal material layer is baked and cured. Next, a photoresist is formed over the first nano-metal material layer, and the first nano-metal material layer is subjected to exposure, developing and etching processes to form the first touch-sensing electrode layer 120 shown in FIG. 2A and FIG. 2B. The photoresist is then removed. Then, a transparent conductive dry film is formed on the first touch-sensing electrode layer 120, in which the transparent conductive dry film includes the first insulating layer 150 shown in FIG. 2A and FIG. 2B and a second nano-metal material layer disposed thereon. The second nano-metal material layer is subjected to exposure, developing and etching processes to form the second touch-sensing electrode layer 140 shown in FIG. 2A and FIG. 2B. Subsequently, an insulating material layer is formed over the substrate 110, the first touch-sensing electrode layer 120, the second touch-sensing electrode layer 140, and the first insulating layer 150. A photoresist is formed over the insulating material layer. The insulating material layer is subjected to exposure, developing and etching processes to form the second insulating layer 160 shown in FIG. 2A and FIG. 2B. A metal layer is formed over the substrate 110 shown in FIG. 2A and FIG. 2B, and a photoresist is subsequently formed on the metal layer. An exposing process, a developing process and an etching process is carried out to form the circuit layer 170. The photoresist is then removed.

Figure 6:
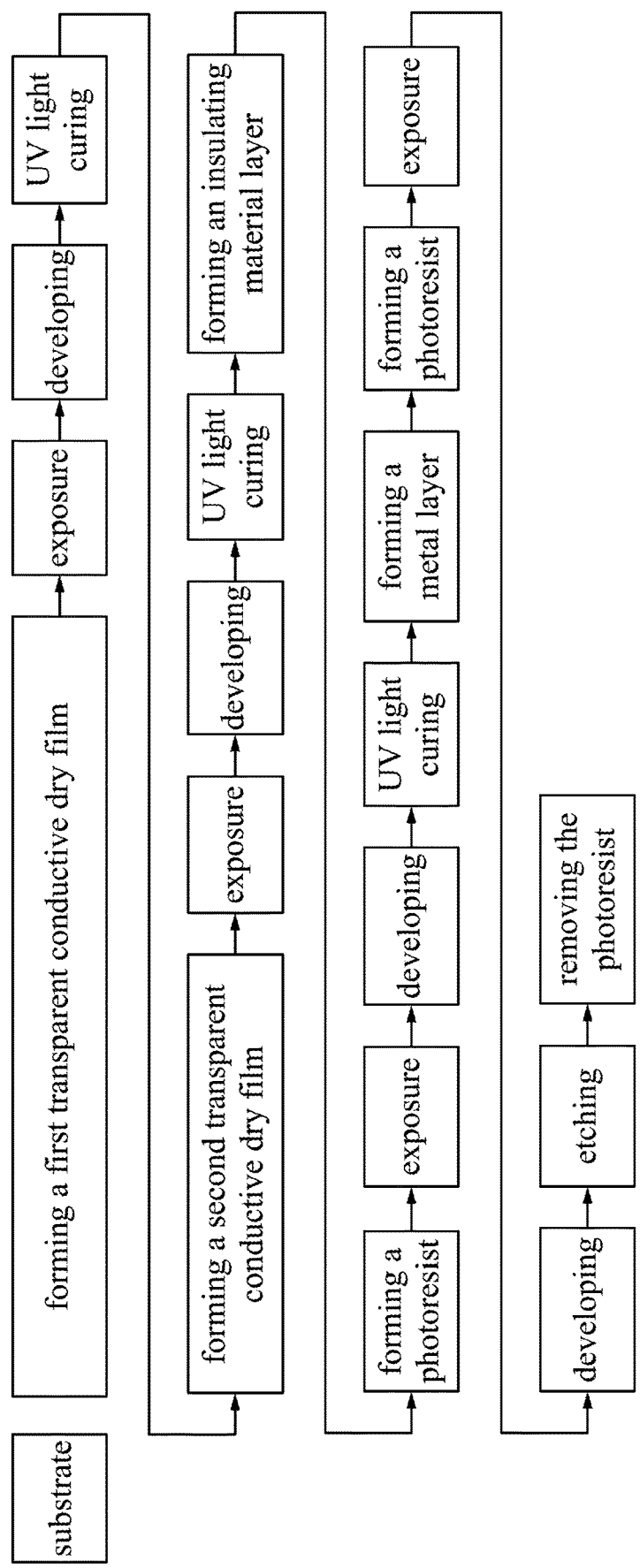
FIG. 6 is a flow chart for manufacturing the touch control device shown in FIG. 3 according to another embodiment of the present invention.

FIG. 6 is a flow chart for manufacturing the touch control device shown in FIG. 3 according to another embodiment of the present invention. The flow chart comprises the following operations. First, a first transparent conductive dry film is formed on the substrate 210 shown in FIG. 3, in which the first transparent conductive dry film comprises the bottom insulating layer 230 shown in FIG. 3 and a first nano-metal material layer disposed thereon. Next, the first nano-metal material layer is subjected to exposure, developing and etching processes to form the first touch-sensing electrode layer 220 shown in FIG. 3. Then, a the second transparent conductive dry film is formed on the bottom insulating layer 230 and the first touch-sensing electrode layer 220, in which the second transparent conductive dry film includes the first insulating layer 250 shown in FIG. 3 and a second nano-metal material layer disposed thereon. The second nano-metal material layer is subjected to exposure, developing and etching processes to form the second touch-sensing electrode layer 240 shown in FIG. 3. Subsequently, an insulating material layer is formed on the substrate 210 and the second touch-sensing electrode layer 240. A photoresist is formed over the insulating material layer. The insulating material layer is subjected to exposure, developing and etching processes to form the second insulating layer 260. A metal layer is formed over the substrate 210, and a photoresist is subsequently formed on the metal layer. An exposing process, a developing process and an etching process is carried out to form the circuit layer 170 shown in FIG. 3. The photoresist is then removed.

In summary, the present invention provides a touch control device which can improve the short circuit problem of traces. During the process of etching copper, the nano-metal wires in the touch control device are not attacked, and the formation of copper/silver co-crystals and short circuit problem of traces are prevented.

Although the present invention has been described in considerable detail with reference to certain embodiments thereof, other embodiments are possible. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch control device, comprising:
   a substrate comprising a first region and a second region adjacent thereto;
   a first touch-sensing electrode layer and a second touch-sensing electrode layer disposed over the substrate and located in the first region;
   a first insulating layer located between the first touch-sensing electrode layer and the second touch-sensing electrode layer;
   a second insulating layer disposed on the second touch-sensing electrode layer, the second insulating layer completely covering the first region and partially covering the second region; and
   a circuit layer located over the substrate and having a first portion and a second portion extending from the first portion, wherein the first portion is in direct contact with the substrate, and the second portion is located in the second region and partially covers the first touch-sensing electrode layer or the second touch-sensing electrode layer to form a contact area.

2. The touch control device of claim 1, wherein a height difference between the first portion and the second portion of the circuit layer ranges from 0.02-20 µm in a first direction.

3. The touch control device of claim 2, wherein a first thickness of the first touch-sensing electrode layer ranges from 2~30 µm in the first direction.

4. The touch control device of claim 2, wherein a second thickness of the second touch-sensing electrode layer ranges from 1.5~20 µm in the first direction.

5. The touch control device of claim 1, further comprising a bottom insulating layer disposed between the first touch-sensing electrode layer and the substrate.

6. The touch control device of claim 1, wherein both of the first touch-sensing electrode layer and the second touch-sensing electrode layer comprise a plurality of nano-metal wires.

7. The touch control device of claim 1, wherein both of the first touch-sensing electrode layer and the second touch-sensing electrode layer comprise a photosensitive material.

8. The touch control device of claim 2, wherein in the second region, the circuit layer and the second touch-sensing electrode layer have a first width and a second width, respectively, in a second direction perpendicular to the first direction, and the first width is smaller than the second width.

9. The touch control device of claim 2, wherein in the second region, the circuit layer and the second touch-sensing electrode layer respectively have a first width and a second width in a second direction that is perpendicular to the first direction, and the first width is greater than the second width.

10. The touch control device of claim 1, wherein the second insulating layer comprises a transparent photosensitive material.

\* \* \* \* \*